United States Patent [19]

King et al.

[11] Patent Number: 4,756,878
[45] Date of Patent: Jul. 12, 1988

[54] GRID SPACER AND METHOD OF MAKING SAME

[75] Inventors: Peter P. King; John F. Patterson; Jack Yates, all of Richland; Charles A. Brown, Kennewick, all of Wash.

[73] Assignee: Advanced Nuclear Fuels Corporation, Bellevue, Wash.

[21] Appl. No.: 936,448

[22] Filed: Dec. 1, 1986

[51] Int. Cl.$^4$ ............................................. G21C 3/34
[52] U.S. Cl. .................................... 376/439; 376/441; 376/443; 219/121.17; 219/121.66; 29/906; 29/723; 156/645
[58] Field of Search ............... 376/260, 261, 438, 439, 376/441, 443; 364/474, 559; 219/121 EG, 121 LF; 29/400 N, 723; 156/645

[56] References Cited

U.S. PATENT DOCUMENTS

| | | | |
|---|---|---|---|
| 4,081,324 | 3/1978 | Flora | 376/441 |
| 4,492,844 | 1/1985 | Kobuck | 376/438 |
| 4,541,055 | 9/1985 | Wolfe | 364/474 |

OTHER PUBLICATIONS

Toebes, et al.; "Journal of Basic Engineering", Dec. 1961; pp. 671–678.
Blevins; "Flow–Induced Vibration"; Van Nostrand, 1977; pp. 15–23 and 52–53.
Léon; "Flow–Induced Structural Vibrations", Symposium Karlsruhe (Germany) Aug. 14–16, 1972; pp. 318–332.
Handbook of Hydraulic Resistance; I. E. Idel'Chik; Translated by A. Barouch, M.Sc., Edited by D. Grunaer, P. E. et al; pp. 29–30; 305–306; 310–311; 330.

Primary Examiner—Donald P. Walsh
Attorney, Agent, or Firm—Volker R. Ulbrich; Robert Keith Sharp

[57] ABSTRACT

A marked reduction in the pressure drop of cooling liquid through a grid spacer of a nuclear fuel assembly is attained by convexly contouring the upstream (usually the lower) edges of the grid members. Preferably, they are made streamlined or semicylindrical. This can be done by first beveling and then etching them, by directing a stream of mixture of abrasive and an organic polymer against them, or by traversing an electron or laser beam along them at a power and velocity such as to cause local melting. A lesser improvement is secured by beveling alone. A still further improvement can be obtained by also tapering the downstream (usually upper) edges.

23 Claims, 6 Drawing Sheets

GRID SPACER AND METHOD OF MAKING SAME

INTRODUCTION AND BACKGROUND

This invention is directed to an improvement in spacer grids for nuclear reactor fuel assemblies.

Nuclear reactors for the production of power are, today, almost all provided with rod-type fuel elements containing uranium oxide pellets including fissionable isotopes, such as uranium-235 or uranium-233, and sometimes plutonium-239 oxide. These rods are in fuel assemblies, which comprise a large number of rods spaced from each other and held in position by suitable spacing means.

These spacing means ordinarily take the form of grids, such as are shown in U.S. Pat. No. 3,379,617, granted Apr. 23, 1968 to Harry N. Andrews and Herbert W. Keller. An improved form is shown in U.S. Pat. No. 4,077,843, granted Mar. 7, 1978 to John F. Patterson and Barney S. Flora. These grids may be formed of a single metal, such as stainless steel or one of the zircaloys, or, as shown in the Patterson and Flora patent, they may be made of two different metals. The common characteristic is that they are made up of a large number of thin metallic straps, or plates, which cross each other, usually at right angles, and contain springs which press against the fuel rods. The plates are positioned so that they present edges to the flow of coolant, which may be water or a liquid metal, such as molten sodium.

In the United States, the flow of liquid in power reactors is invariably vertical and in an upward direction. In other types of reactors used in other countries, the flow may be horizontal. The flow of coolant is at a high velocity, and the power required to pass it through the assemblies is considerable. An appreciable proportion of the resistance to flow in an assembly is caused by the spacer grids.

SUMMARY OF THE INVENTION

This invention relates to an improvement in the grids which materially reduces the resistance to flow and, therefore, the power required to drive the cooling fluid through the assembly. Despite the fact that the members making up the grids are only a few hundredths of an inch thick and have depths of about an inch, and that the meshes of the grids are occupied by rods, springs, etc., we have found that a marked reduction in the pressure drop through the grid is secured by convexly contouring the edges which are positioned upstream relative to the flow of the cooling fluid. In American power reactors, this will be at the bottom edges of those plates.

Most desirably, the edges are rounded to a streamlined, approximately semiellipsoidal form. This may be obtained in several ways. The edges may be coined or clipped to a rough approximation of that shape, and they then may be etched, which gives a rounded form. Another method is to direct a stream of a stiff mixture of abrasive and an organic polymer through the grid. This has been found to give the greatest reduction in resistance of any method. Another method is to direct an electron beam, focused to a narrow width, along the edges of the plates at sufficient power to produce local melting of the edges. This has been found to produce a nearly-perfect semicylindrical form which is also very desirable. It has the further advantage, when the plates are zircaloy, of improving their resistance to corrosion in a boiling water reactor environment. A laser beam can be substituted for the electron beam if desired.

An additional improvement can be obtained by tapering the downstream edges of the plates. A considerable improvement, though less than that attained by rounding, can be secured by beveling the upstream edges of the plates.

DETAILED DESCRIPTION

Figure 1:
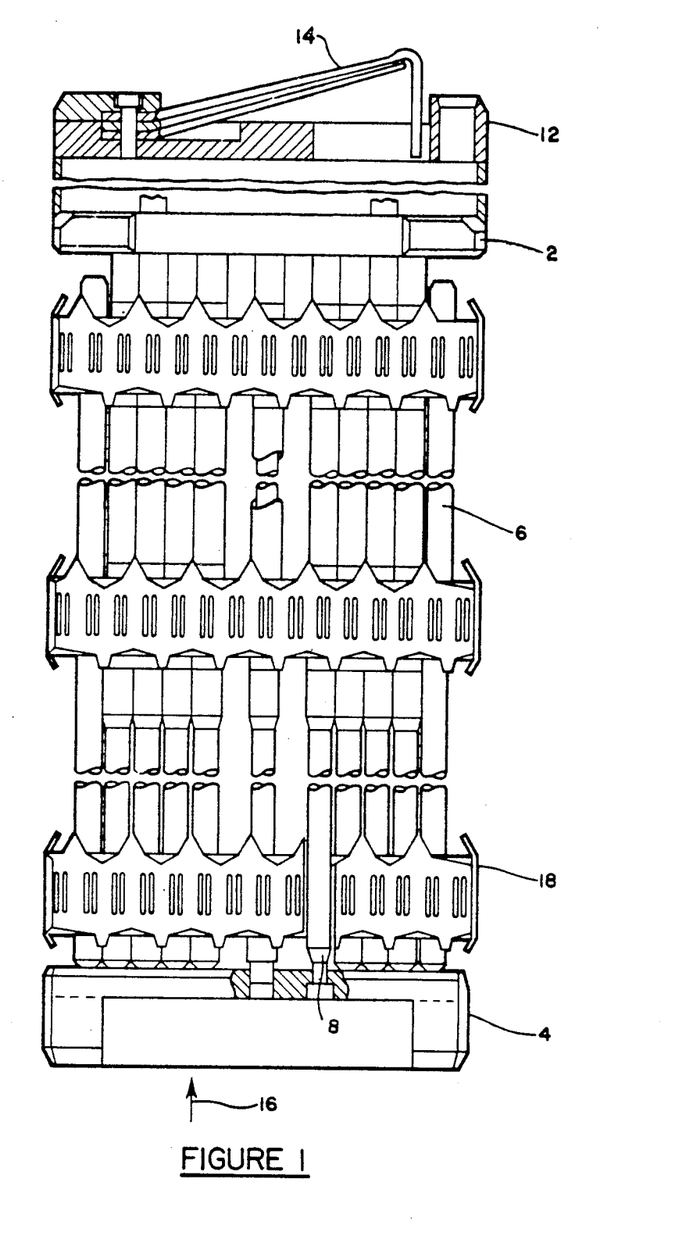
FIG. 1 is an elevation of a typical nuclear reactor fuel assembly for pressurized water reactors.

Referring to FIG. 1, the fuel assembly includes an upper tie plate 2, a lower tie plate 4, and numerous fuel rods 6 extending between the tie plates. There are also a number of guide tubes 8 for control rods, which bind the upper and lower tie plate together. There is also a top-end assembly 12 which may include hold-down springs 14, which maintain the assembly in its proper position in the reactor. Cooling water flows upwardly through the assembly, as indicated by arrow 16.

Figure 2:
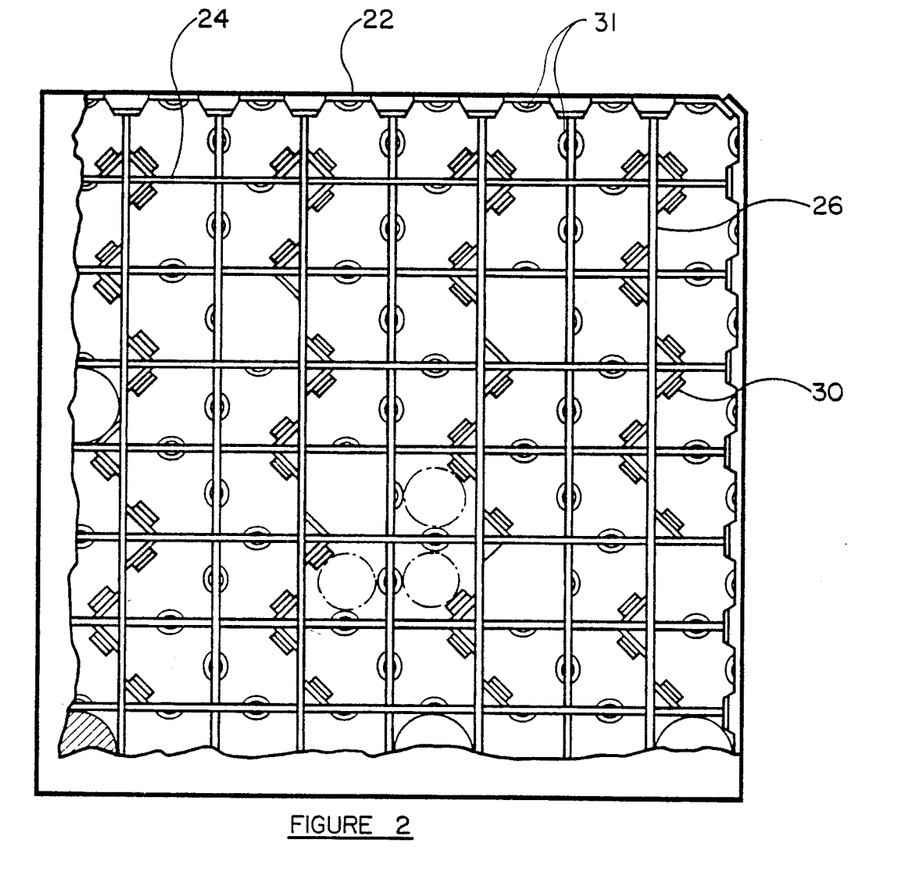
FIG. 2 is a partial plan view of a grid spacer for the assembly shown in FIG. 1.
Figure 3:
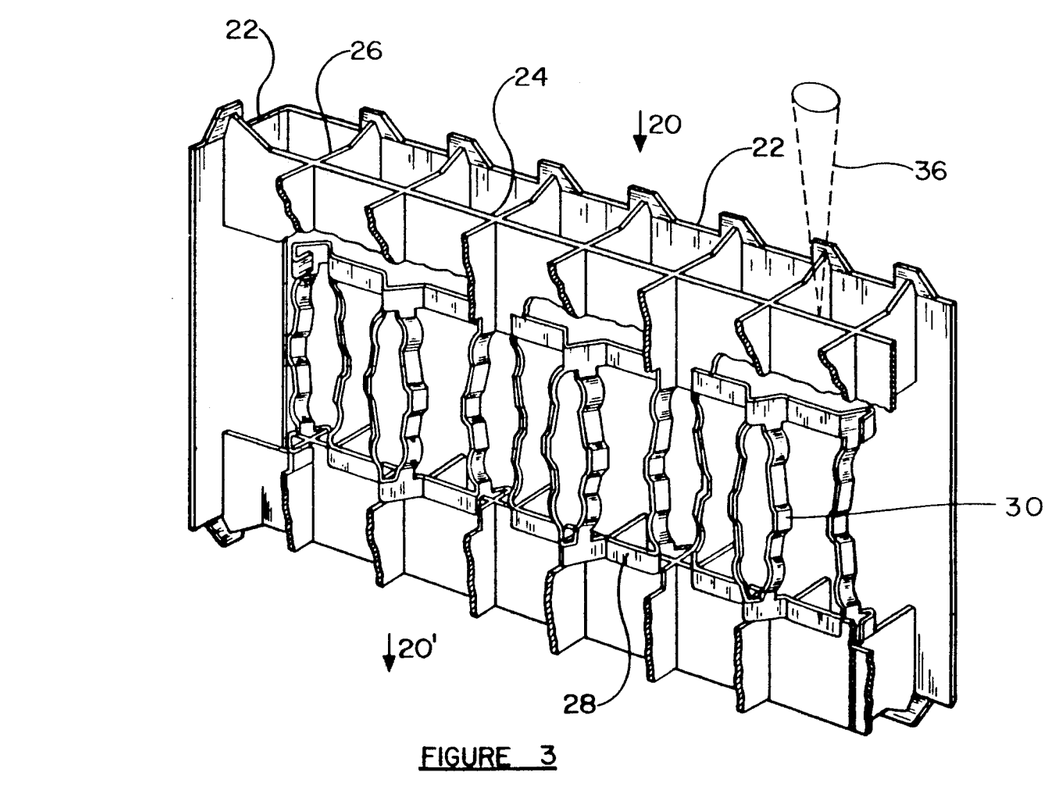
FIG. 3 is a partial perspective view of a grid spacer of the type shown in FIG. 2, shown with the bottom uppermost in the drawing.
Figure 4A:
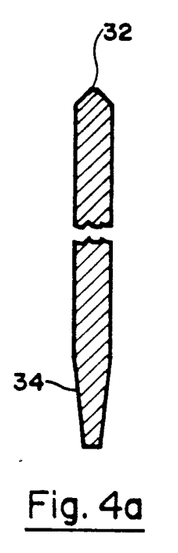
FIGS. 4a and 4b are partial sections of a strip from a grid spacer such as is shown in FIG. 3, showing steps in one method of forming the grid member.
Figure 4B:
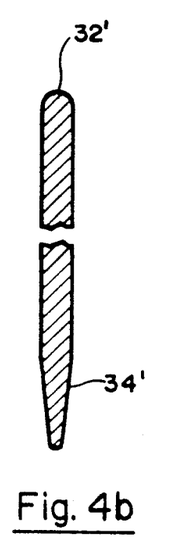

Spaced at intervals along the height of the assembly are a number grid spacers 18. A partial plan view of such a grid spacer is shown in FIG. 2. This spacer is of the type described and claimed in U.S. Pat. No. 4,077,843, granted Mar. 7, 1978 to John F. Patterson and Barney S. Flora, and assigned to the assignee of the present application. This patent may be consulted for a detailed description and is expressly incorporated by reference in this disclosure. FIG. 3 shows a partial perspective of this grid spacer with the bottom shown uppermost, the flow of water being indicated by the arrows 20,20'. Referring to FIGS. 2 and 3, the grid spacer includes a perimeter strip 22, which is in the form of a square encircling the entire member. There are also a plurality of grid members 24 and a second set of grid members 26 arranged at right angles to members 24. These two sets of grid members define grid apertures through which the fuel rods, some of which are shown in "phantom" lines, extend. Mounted on certain grid members are spring strips 28 (FIG. 3) which carry springs 30, one of which extends into each of the apertures formed by the grid members. The grid members 24,26 are deformed to produce dimples 31, which are of the "flow-through" type, i.e., open at their tops and bottoms. The bottom or leading edges of grid members 24,26 are convexly contoured, while the top or trailing edges (shown at the bottom of FIG. 3) are preferably tapered. FIGS. 4a and 4b are illustrations of this. During manufacture of the strips, the edges which are to be the leading edges may be coined as shown at 32 in FIG. 4a, while the edges which are to be trailing edges may be coined to a more acute angle, as shown at 34 in the same Figure. If used in this form, a reduction in flow resistance will be attained. However, improved results are secured by etching each of the edges in acid. This produces, very nearly, the shapes shown in FIG. 4b at 32' and 34'. It will be noted that the leading edge 32' has assumed, essentially, a semi-cylindrical cross-section, while the end of tapered portion 34' has been rounded.

Figure 5A:
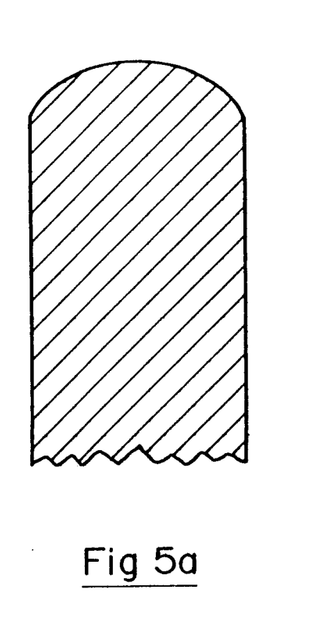
FIGS. 5a, 5b and 5c are partial sections, greatly enlarged, showing the results of other methods of forming grid members.
Figure 5B:
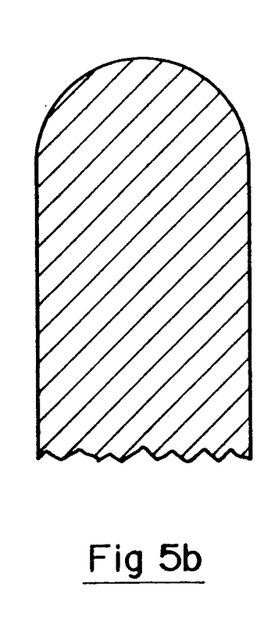

Another method of rounding the leading edges is illustrated by FIGS. 3, 5a, and 5b. In this method, after the grid spacer has been assembled, an electron beam 36 (FIG. 3) is focused on the edges and traversed therealong. The power of the beam and the rate of travel are correlated to produce a local melting. The surface tension of the molten metal draws it into, very nearly, a perfect semicylindrical shape. FIGS. 5a and 5b reproduce greatly enlarged photographs of cross-sections of such a strip after treatment by the electron beam. The shape shown in FIG. 5a was produced by a beam of 0.5 milliampere moving at a speed of 20 inches per minute along the strip of zircaloy-4 which was about 0.02 inch thick. The shape shown in FIG. 5b was the result of using a beam of 0.6 milliampere on the same type of strip at the same velocity. A suitably-powered laser beam could be substituted for the electron beam with the same results. The beam can be traversed relative to the grid members by the use of a conventional "X-Y table."

Figure 6:
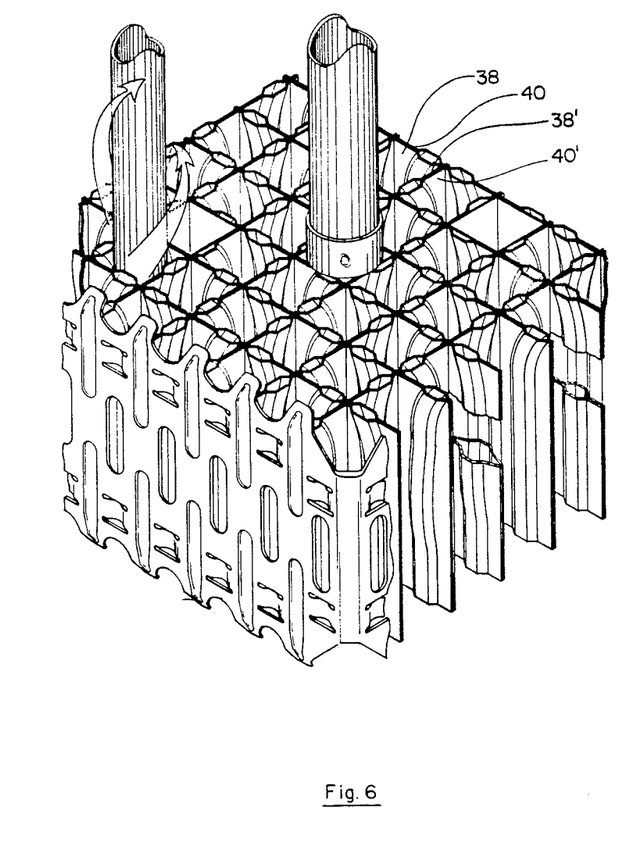
FIG. 6 is a partial perspective view of another form of grid spacer.
Figure 7:
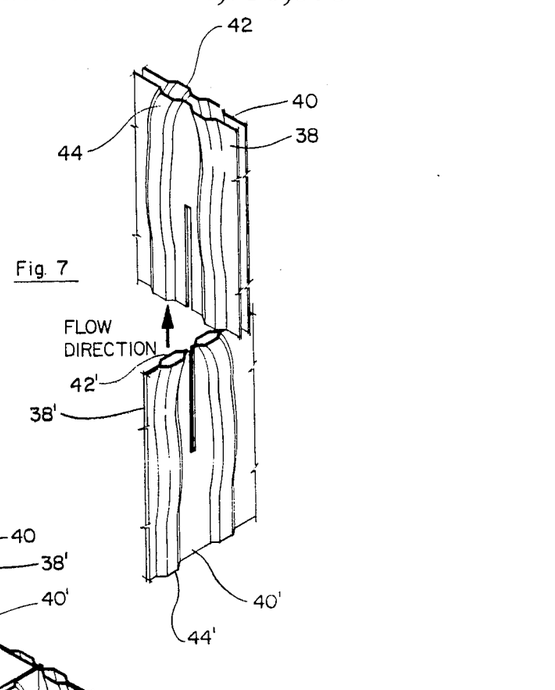
FIG. 7 is a broken view showing the structure and method of assembly of the grid spacer shown in FIG. 6.
Figure 8A:
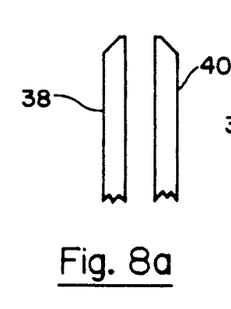
FIGS. 8a and 8b are partial sections showing the formation of grid members for the grid spacer shown in FIGS. 6 and 7.

In FIGS. 6 and 7, we show a deflecting-type grid. This grid is disclosed and claimed in application Ser. No. 838,768, entitled "Mixing Grid," filed on Mar. 12, 1986 by John F. Patterson, et al., and assigned to the assignee of this application. That application is expressly incorporated herein by reference. In this type of grid, the grid members are made up of pairs of strips 38,40 and 38',40', which may be welded together at their intersections. These plates are formed with matching channels 42,44, and 42',44', which are curved to deflect the cooling fluid as more fully-described in the above cited application. During their manufacture, these strips may be sheared at an angle, as shown in FIG. 8a. When placed together, the composite strip will assume the form shown in FIG. 8b, approximating that of FIG. 4a. If desired, the assembled strip may be etched to approximate the form shown in FIG. 4b. However, the form of grid spacer shown in FIG. 6 has, inherently, a very low resistance, and the etching step may not be worthwhile.

Figure 8B:
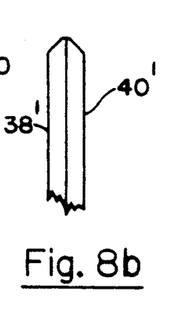

Still another method of producing the rounded edge or edges is to direct a stream of a thick mixture of abrasive and an organic polymer through a grid, the strips preferably having the form shown in FIG. 4a or FIG. 8b. If the stream is surged back and forth, both edges of the strips will be rounded to the form shown in FIG. 5c. This is a convenient way of producing a form of strip, approximately that shown in FIG. 4b.

Figure 5C:
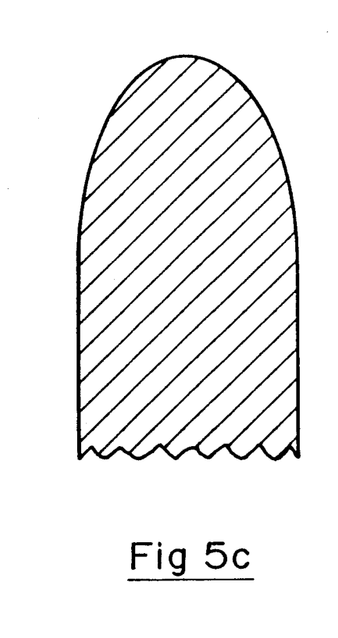

FIG. 5c, which is based on a photograph, show on a greatly enlarged scale, the cross-sectional shape of the edges produced by this method.

EXPERIMENTAL EXAMPLES

EXAMPLE I

In the following tests, grid spacers were incorporated in test fuel assemblies, including fuel rods of standard size and spacing (pitch) and the pressure drop across a spacer was measured at a water velocity typical of that present in operating nuclear reactors. The spacer was then removed from the assembly, the lower edges of all grid members rounded, and then replaced in the assembly. The pressure drop was again measured, and the reduction in pressure drop produced by rounding was determined. Results are shown in Table I, where in the types of spacer designated under "Test Piece" were as follows:

A. A 6×6 intermediate grid of the type shown in FIGS. 1, 1a, and 1b of application Ser. No. 838,768, having double strips. The edges were rounded by hand grinding.

B. A 6×6 test spacer made from a 17×17 spacer for a pressurized water reactor fuel assembly. Rounding was by electron-beam melting.

C. A 5×5 test spacer made from a 9×9 spacer for a boiling water reactor fuel assembly. Rounding was by electron-beam melting.

TABLE I

| TEST PIECE | ROD PITCH (IN.) | ROD DIAM. (IN.) | STRIP THICKNESS (IN.) | % REDUCTION IN SPACER PRESSURE DROP |
|---|---|---|---|---|
| A | 0.496 | 0.376 | 2 × 0.012 | 10 |
| B | 0.496 | 0.376 | 0.020 | 7 |
| C | 0.572 | 0.424 | 0.020 | 8 |

EXAMPLE II

A full-sized 14×14 fuel assembly of the type used in pressurized water reactors (designated "D") was utilized for test purposes. Some of the grid strips were 0.026 inches and some 0.020 inches thick. Some of the spacers were of standard form and some had the lower edges of the grid strips rounded by electronbeam melting. The pressure drop, under rates of water flow typical of reactor operating conditions, was measured across various spacers, and the average reduction obtained by rounding was determined. Results are shown in Table II.

TABLE II

| TEST PIECE | ROD PITCH (IN.) | ROD DIAM. (IN.) | STRIP THICKNESS (IN.) | % REDUCTION IN SPACER PRESSURE DROP |
|---|---|---|---|---|
| D | 0.550 | 0.417 | 0.026/0.020 | 6.5 |

The following experiments involved the use of a stiff but flowable abrasive composition comprising a viscous carrier laden with abrasive granules, such as is described in U.S. Pat. No. 3,909,217, granted Sept. 30, 1975, to Kenneth E. Perry. The mixture was of dough-like consistency and contained 16 mesh and 36 mesh grains of silicon carbide. It approximated the composition of Example 3 of the above patent.

EXAMPLE III

A 6×6 test spacer of the type shown in FIGS. 2 and 3 having an overall height of three inches was made up, and its pressure drop determined in the same manner as described in Example I above. An identical test spacer (designated Test Piece E) was abraded by pushing the composition described in the preceeding paragraph back and forth through it at 100 pounds per square inch for 150 cycles over a period of 80 minutes, in directions perpendicular to the plane defined by the lower edges of the grid members. After cleaning, it was found, on inspection, that the top and bottom edges of grid members 24,26, dimples 31, and to a lesser degree, springs 30, received the form shown in 5c. Results, tabulated in the same manner as in the previous examples, are shown in Table III.

TABLE III

| TEST PIECE | ROD PITCH (IN.) | ROD DIAM. (IN.) | STRIP THICKNESS (IN.) | % REDUCTION IN SPACER PRESSURE DROP |
|---|---|---|---|---|
| E | 0.496 | 0.376 | 0.020 | 20 |

EXAMPLE IV

A full-size 15×15 spacer of the type shown in FIGS. 2 and 3 was abraded in the manner described in Example III. Since the spacers are subjected to a force on the order of 5,000 pounds in each direction during processing, it is important to incorporate support across the spacer span. This spacer was processed for 145 cycles at 100 psi over a period of 196 minutes. This grid (designated Test Piece F) was mounted with other spacers in a test assembly described in Example II and the pressure drop across it determined. Results are shown in Table IV.

TABLE IV

| TEST PIECE | ROD PITCH (IN.) | ROD DIAM. (IN.) | STRIP THICKNESS (IN.) | % REDUCTION IN SPACER PRESSURE DROP |
|---|---|---|---|---|
| F | 0.550 | 0.417 | 0.018 | 22.5* |

*Average of two runs.

While we have described several embodiments of our invention in considerable detail, it will be apparent to those skilled in the art that various changes can be made. We therefore wish our invention to be limited solely by the scope of the appended claims.

The embodiments of the invention in which a proprietary right or privilege is claimed are defined as follows:

1. A grid spacer for use in a nuclear fuel assembly for holding the fuel rods in relatively fixed positions comprising a plurality of grid strips intersecting each other to form cells, through which the fuel rods will extend;
   springs on said grid strips positioned in said cells so as to engage said fuel rods;
   a peripheral strip secured to the ends of said grid strips;
   the grid strips having the edges which will be upstream relative to the flow of cooling fluid when mounted in the reactor being convexly contoured.

2. A grid spacer as defined in claim 1 wherein said edges are rounded.

3. A grid spacer as defined in claim 4 wherein said edges have a streamlined cross section.

4. A grid spacer as defined in claim 2 wherein said edges are substantially semicylindrical.

5. A grid spacer as defined in claim 2 wherein said edges are formed by passing a focused energy beam along said edges at a power level sufficient to locally melt the metal.

6. A grid spacer as defined in claim 5 wherein said energy beam is an electron beam.

7. A grid spacer as defined in claim 5 wherein said energy beam is a laser beam.

8. A grid spacer as defined in claim 3 wherein said edges are formed by pushing a stiff but flowable mixture including abrasive granules back and forth through said grid.

9. A grid spacer as defined in claim 1 wherein each of said grid strips comprises a pair of contacting metal strips and wherein each of the strips of each pair is beveled so that the common edge is convexly contoured.

10. A fuel assembly for use in a nuclear reactor comprising an upper end plate and a lower end plate;
    a large number of elongated, parallel fuel rods extending between said end plates;
    at least one grid spacer between said end plates and holding said fuel rods in spaced relationship to each other;
    said grid spacer comprising a plurality of thin grid plates intersecting each other to form cells, through each of which a fuel rod extends, opposing springs and dimples in each cell contacting the fuel rod passing therethrough, and a perimeter strip surrounding said fuel rods and connected to the ends of said grid strips;
    at least the lower edges of said grid strips being convexly contoured.

11. A fuel assembly as defined in claim 10 wherein said lower edges are rounded.

12. A fuel assembly as defined in claim 11 wherein said lower edges are substantially semicylindrical.

13. A fuel assembly as defined in claim 12 wherein said lower edges are formed by passing a focused energy beam along said edges at power level sufficient to locally melt the metal.

14. A fuel assembly as defined in claim 10 wherein said edges are rounded by pushing a stiff but flowable mixture of abrasive and an organic polymer back and forth through a grid spacer, thereby rounding said edges to a substantially streamlined form.

15. In a method of making a grid spacer for a nuclear reactor wherein a plurality of thin, narrow strips are assembled intersecting each other so as to form cells through which fuel rods will extend,
    the improvement comprising convexly contouring those edges of said strips which form at least one face of said grid spacer.

16. A method of making a grid spacer as defined in claim 15 comprising:
    forming a grid of plurality of intersecting metallic grid strips and a perimeter strip; and
    passing a focused energy beam along each of the edges of said grid strips with a power sufficient to cause local melting of said edges, whereby surface tension will cause said edges to become substantially semicylindrical.

17. A method as defined in claim 16 wherein said beam is an electron beam.

18. A method as defined in claim 16 wherein said beam is a laser beam.

19. In method of making a grid spacer for a nuclear reactor as defined in claim 15,
    the improvement comprising coining one edge of each strip to a generally convex countour, then assembling said grid spacer, with said convexly contoured edges all on the same face of the grid spacer.

20. A method as defined in claim 19 wherein the edges of said strips, after being coined, are etched to smooth the surface.

21. In a method of making a grid spacer for a nuclear reactor as defined in claim 15, wherin said spacer comprises a plurality of pairs of thin, narrow strips, the strips of each pair being mounted in contact with each other, and the pairs being assembled intersecting each other so as to form the cells through which fuel rods will extend, the improvement which comprises shearing each of said strips at an angle to the plane of its surface and assembling said strips in pairs so that the edges sheared at an angle are together and are inclined in opposite directions from the plane of contact of the strips fo the pair, thereby forming a convexly contoured common edge, then assembling said grid spacer with said convexly contoured common edges all on the same face of said grid spacer.

22. In a method of making a grid spacer for a nuclear reactor as defined in claim 15, the improvement comprising directing a stream of a stiff but flowable mixture of abrasive and an organic polymer against at least one edge of said strips, there by rounding said edge of each of said strips, to a substantially streamlined form.

23. The method as defined in claim 22, wherein said mixture is pushed back and forth through said grid spacer, thereby rounding both edges of said strips.

* * * * *

UNITED STATES PATENT AND TRADEMARK OFFICE
CERTIFICATE OF CORRECTION

PATENT NO. : 4,756,878
DATED : July 12, 1988
INVENTOR(S) : Peter P. KING, et al.

It is certified that error appears in the above-identified patent and that said Letters Patent is hereby corrected as shown below:

Column 5, line 59; delete "claim 4" and substitute --claim 2--.

Signed and Sealed this

Twenty-first Day of March, 1989

Attest:

DONALD J. QUIGG

Attesting Officer

Commissioner of Patents and Trademarks